Patented Oct. 12, 1954

2,691,660

UNITED STATES PATENT OFFICE 2,691,660

PREPARATION OF MALEIC ANHYDRIDE

Martval John Paul Hartig, Glen Ridge, N. J., assignor to E. I. du Pont de Nemours & Company, Wilmington, Del., a corporation of Delaware No Drawing. Application March 7, 1950,
Serial No. 148,269

7 Claims. (Cl. 260—346.8)

This invention relates to a new and improved method for the production of maleic anhydride by the catalytic vapor phase oxidation of saturated aliphatic hydrocarbons, particularly butane.

This application is a continuation-in-part of applicant's application Ser. No. 78,669, filed February 26, 1949, now abandoned.

Heretofore the art has taught the preparation of maleic anhydride by the catalytic vapor phase oxidation of a large number of raw materials such as benzene, furfural, furane and its derivatives, crotonic acid, turpentine, naphthalene, butadiene, succinic acid, low boiling coal tar and olefins. Of all the raw materials suitable for the direct manufacture of maleic anhydride, the hydrocarbons are by far the most economical. This has been the primary reason for the commercial exploitation of benzene and butene as raw materials. The reason that other hydrocarbons, particularly the saturated paraffins such as butane, have not been used is that no catalysts have been known which would give satisfactory yields. Heretofore, it was not known that it was possible to obtain maleic anhydride in any substantial yields by oxidizing paraffin hydrocarbons. The oxidation of such raw materials to produce maleic anhydride has been a perplexing problem in the art, to the extent that a satisfactory oxidation from a practical and economic point of view has not been attained.

An object of the present invention is to provide a new and improved process for the preparation of maleic anhydride. A further object is to provide a new and improved process for the catalytic vapor phase oxidation of saturated aliphatic hydrocarbons to maleic anhydride in high yields. A still further object is to provide a new and improved type of catalyst for carrying out the vapor phase oxidation of saturated hydrocarbons to maleic anhydride.

These and other objects are accomplished according to the present invention by contacting the vapor of a saturated aliphatic hydrocarbon in the presence of oxygen with a precipitated oxide catalyst comprising molybdenum oxide combined with a basic metal oxide from the group consisting of the oxides of cobalt and nickel, the atomic ratio of the basic metal to molybdenum being less than 1:1, at an elevated temperature between 300° C. and 600° C., and thereafter recovering the maleic anhydride from the effluent gases.

In a more specific form the process of the present invention is carried out by contacting the vapors of a saturated aliphatic hydrocarbon having from 4 to 10 carbon atoms, inclusive, in the presence of oxygen with a precipitated oxide catalyst comprising molybdenum oxide combined with a basic metal oxide from the group consisting of the oxides of cobalt and nickel, the atomic ratio of the basic metal to molybdenum being less than 1:1, and combined with an acidic promoter from the group consisting of the oxides of boron, phosphorus, and vanadium, at a temperature between 350° C. to 550° C., and thereafter recovering the maleic anhydride from the effluent gases. Preferably, the precipitated oxide catalyst comprises molybdenum oxide combined with the basic metal oxide, the atomic ratio of basic metal to molybdenum being between 1:1 and 0.3:1, and combined with 0.1%–15%, by weight of the total catalyst, of the acidic promoter, calculated as metal.

In a particular preferred form, the invention comprises bringing the vapor of n-butane in the presence of oxygen in contact with a precipitated oxide catalyst essentially consisting of molybdenum oxide combined with cobalt oxide, the atomic ratio of cobalt to molybdenum being between 1:1 and 0.5:1, and combined with 0.1%–5%, by weight of the catalyst, of boron oxide, calculated as boron, at a temperature between 400° C.–500° C., and thereafter recovering the maleic anhydride from the effluent gases.

By the oxidization of saturated aliphatic hydrocarbons in the presence of oxygen it should be understood that the presence of sufficient free oxygen is necessary in order to effect the oxidation reaction. Such oxygen may be obtained by supplying free oxygen to the hydrocarbon feed, from oxygen containing mixtures such as air, oxygen liberating compounds and the like.

The following examples illustrate specific embodiments of the invention, all proportions being given by weight, unless otherwise stated, in these examples and throughout the specification.

*Example I*

The following example illustrates the preparation of maleic anhydride by the oxidation of butane using a precipitated oxide catalyst of molybdenum oxide combined with cobalt oxide.

The catalyst was prepared as follows:

One and two-tenths moles of molybdenum trioxide were dissolved in two moles of ammonium hydroxide and the solution was diluted to four liters. One mole of cobalt nitrate hexahydrate, $Co(NO_3)_2.6H_2O$, was dissolved in 400 ccs. of water. Each of the solutions was heated to incipient boiling and a purple precipitate (a cobalt molybdate) was formed by the addition of the cobalt nitrate solution to the molybdate solution. This precipitate was filtered, dried and maintained at 450° C. in air for about 4 hours. The resulting compound was the chemically combined oxides of the two metals. The atomic ratio of cobalt to molybdenum was between 1:1 and 0.5:1.

This catalyst in finely-divided form (4–8 mesh) was introduced into a fixed bed type of reactor comprising an aluminum bronze block which was 12 inches long and 4 inches in diameter. A ¾ inch diameter hole was drilled through the block and a stainless steel tube was fitted therein. An annular reactor was then formed by inserting a smaller diameter stainless steel tube into the larger tube, the smaller tube being centered by means of stainless steel discs at the bottom and in the center of the larger stainless steel tube. The stainless steel disc in the center of the annular reactor tube served as a support for 50 grams of the catalyst. The bronze block was heated by means of cartridge type heaters which were inserted into the block. In this run the ratio of butane to air (volumes of butane to volumes of air) was 2/100 and the block was maintained at a temperature of about 470° C. The butane and air were premixed and preheated before entering the block, preheating taking place by coiling the inlet tubing around the block before introducing the gas into the annular reaction chamber. The gas was introduced at the top of the annular space containing the catalyst, and the outlet was at the bottom. The space velocity (volume of gas at Standard Conditions of temperature and pressure per volume of catalyst per hour) of the gas was 720. The maleic anhydride was recovered in a type of carbon adsorption system operated at 100° C. as described in applicant's copending application Ser. No. 755,014, filed June 16, 1947.

The conversion expressed as $$100 \times \frac{\text{moles of butane oxidized}}{\text{moles of butane feed}}$$

was 20%, and the yield expressed as $$100 \times \frac{\text{moles of maleic anhydride produced}}{\text{moles of butane oxidized}}$$

was 48%. The product was pure white in color and did not discolor on aging. It was free from degradation products, and contained no measurable maleic or fumaric acid. It melted at 53.8° C.

*Example II*

The following example illustrates the preparation of maleic anhydride by the oxidation of butane using a precipitated oxide catalyst of molybdenum oxide combined with cobalt oxide and, as a promoter, boron oxide, and the subsequent absorption in water to form maleic acid.

The catalyst was prepared as follows:

One mole of molybdenum trioxide was dissolved in two moles of ammonium hydroxide and the solution was diluted to four liters. 100 grams of boric acid were dissolved in the solution which was then heated to 95° C. One mole of cobalt nitrate hexahydrate was dissolved in 400 ccs. of water and heated to 95° C. The cobalt nitrate solution was poured into the molybdate solution and a purple precipitate was formed. This precipitate was filtered off, dried and maintained at 400° C. in the presence of air for about 4 hours. The resulting compound was the chemically combined oxides of the three metals. The activated catalyst was then ground to the desired size and was ready for use. The atomic ratio of cobalt to molybdenum was 0.9:1.

The catalyst in powdered form (35–100 mesh) was introduced into a fluid bed type of reactor comprising a stainless steel tube 3 feet long and having an inside diameter of 2 inches. The tube was provided with a cone-shaped bottom and the top of the tube was adapted so that another length of tubing could be added to provide for reactors up to six feet in height. The air and butane were metered with rotameters into the bottom of the bed through separate preheaters and into a mixing zone wherein a butane/air ratio of 5/100 was formed. The space velocity was 412 hour$^{-1}$. The settled bed height of the powdered catalyst was 2 feet, and the temperature in the reaction chamber was maintained at about 475° C. by the intermittent application of a Bunsen burner flame to the outside of the stainless steel tube.

Maleic acid was formed by conducting the effluent gases into water, thereby dissolving the maleic anhydride therein to form the acid. The amount of maleic acid formed was determined by titration of aliquot samples. Representative samples of the effluent gas were collected and analyzed by means of Orsat techniques for carbon dioxide, carbon monoxide and oxygen. Yields were in general calculated on oxygen balance. In the above example, the conversion was 46% and the yield was 60%. The maleic acid formed was colorless.

*Example III*

The following example illustrates the preparation of maleic anhydride by the oxidation of butane using a precipitated oxide catalyst of molybdenum oxide combined with cobalt oxide and, as a promoter, vanadium oxide.

The catalyst was prepared as follows:

One mole of molybdenum trioxide was dissolved in two moles of ammonium hydroxide. Fifteen grams of vanadium pentoxide were added to the solution which was diluted to four liters and heated to boiling during which time the vanadium pentoxide dissolved. One mole of cobalt nitrate hexahydrate dissolved in 400 ccs. of water was heated to boiling in another vessel. A purplish brown precipitate (a cobalt vanadomolybdate) was formed by the addition of the cobalt nitrate solution to the hot molybdenum solution. The catalyst was filtered, dried and maintained at 400° C. in the presence of air for about 4 hours. The resulting compound was chemically combined oxides of the three metals. The catalyst was introduced into the same type of fluid bed reactor as described in Example II. In this experiment the butane to air ratio was 5/100, the space velocity was 1140 hour$^{-1}$ and the temperature was maintained at about 400° C. The settled bed height of the catalyst was 16.5 inches.

The maleic anhydride in the effluent gases was absorbed in a fixed carbon bed operating at 100° C. The conversion was calculated at 10% and the yield was 58%. The maleic anhydride recovered melted 53.9° C.

*Example IV*

The following example illustrates the preparation of maleic anhydride by the oxidation of butane using a precipitated oxide catalyst of molybdenum oxide combined with nickel oxide and, as a promoter, boron oxide.

The catalyst was prepared as follows:

One mole of molybdenum trioxide was dissolved in two moles of ammonium hydroxide. Eighty grams of boric acid were added to the solution which was diluted to 4 liters and brought to the boiling point. One mole of nickel nitrate hexahydrate, Ni(NO₃)₂.6H₂O, dissolved in 500 ccs. of boiling water was added to the molybdate solution to form a green precipitate (a nickel boromolybdate). The precipitate was filtered, dried and maintained at 400° C. in air for about 4 hours. The resulting compound was the chemically combined oxides of the three metals.

The catalyst in powdered form was introduced into a fluid bed type of reactor as described in Example II. In this example the butane to air ratio was 5/100, the space velocity was 1140 hour$^{-1}$, and the temperature was maintained at about 450° C. The settled bed height was 18 inches.

The maleic anhydride in the effluent gases was recovered in a carbon bed. The conversion was calculated at 16% and the yield was 62%.

*Example V*

The following example illustrates the preparation of maleic anhydride by the oxidation of butane using a precipitated oxide catalyst of molybdenum oxide combined with cobalt oxide and, as a promoter, phosphorus oxide.

The catalyst was prepared as follows:

One mole of molybdenum trioxide was dissolved in two moles of ammonium hydroxide. Fifty grams of phosphoric acid were added, and the solution formed was diluted to four liters with distilled water and brought to the boiling point. One mole of cobalt nitrate hexahydrate was dissolved in 400 ccs. of water and heated to boiling. The cobalt nitrate solution was poured rapidly into the molybdate solution and a purple precipitate (a cobalt phosphomolybdate) was precipitated, filtered, dried and maintained at 400° C. in the presence of air for about 4 hours. The resulting compound was the chemically combined oxides of the three metals.

Ten cubic centimeters of the catalyst in finely-divided form were introduced into the fixed bed type of reactor as described in Example I. In this example the butane to air ratio was 1/100, the space velocity was 18,500 hour$^{-1}$ and the temperature was maintained at about 500° C.

The maleic anhydride in the effluent gases was recovered in a carbon bed. The conversion was calculated at 1% and the yield was 30%.

In each of Examples III to V the atomic ratio of basic metal to molybdenum was between 1:1 and 0.3:1. In each of Examples II to V the proportion of acidic promoter, calculated as the metal rather than as the oxide, was between 0.1% and 15% by weight of the catalyst.

The following table illustrates that the atomic ratio of the basic metal to molybdenum must be less than 1:1 to obtain an active catalyst. The table is based upon the optimum operating conditions for each particular catalyst containing cobalt and molybdenum in various ratios.

| Catalyst | Atomic Ratio of Cobalt to Molybdenum | Catalytic Activity and Yields [1] |
|---|---|---|
| Oxide Catalyst from: | | |
| Commercially prepared cobalt molybdate on alumina. | 1:1 | inactive. |
| Cobalt molybdate from the crystalline hydrate. | 1:1 | Do. |
| Cobalt boromolybdate precipitated from acid solution. | 0.73:1 | active—62% yield. |
| Cobalt boromolybdate precipitated from excess ammonium hydroxide solution. | 1.04:1 | inactive. |
| Cobalt molybdate precipitated from solution containing free molybdic acid. | 0.62:1 | active—48% yield. |
| Cobalt boromolybdate precipitated as in Example II. | 0.90:1 | active—42%. |
| Cobalt boromolybdate precipitated with excess cobalt in slightly basic solution. | 1.59:1 | inactive. |

[1] Yield is defined as:

$$100 \times \frac{\text{moles of maleic anhydride produced}}{\text{moles of butane oxidized}}$$

The above examples are merely illustrative and the invention broadly comprises the preparation of maleic anhydride by the catalytic vapor phase oxidation of saturated aliphatic hydrocarbons in the presence of a precipitated oxide catalyst of the type herein described.

It is to be understood that although n-butane was used as the raw material oxidized to maleic anhydride in the preceding examples, other aliphatic saturated hydrocarbons including the pentanes, hexanes, heptanes, octanes and decanes can be successfully used. Furthermore, it is important to note that although the catalysts of the present invention are unique in their ability to selectively oxidize saturated aliphatic hydrocarbons to maleic anhydride, these catalysts are also effective in the oxidation of the olefins, such as the butenes; diolefins, such as the butadienes; and various aromatic hydrocarbons, such as benzene, to maleic anhydride.

In applicant's copending application Ser. No. 148,270, filed of even date herewith, now U. S. Patent 2,625,519, which application is a continuation-in-part of U. S. Ser. No. 78,670, filed February 26, 1949, now abandoned, the catalysts herein considered are claimed per se. As more fully discussed in that application, these catalysts, although made up of chemically combined metal oxides, are not definite chemical compounds in one sense since the atomic ratio of the elements may vary somewhat. However, all of the catalysts which have shown themselves to be active, are characterized by having an atomic ratio of basic metal to molybdenum of less than 1:1.

Molybdenum combined in some manner with oxygen is the essential component of the type of catalyst embodied herein and it is in this sense of the word that the term "molybdenum oxide" is used to designate the form in which molybdenum is present in the subject catalysts. Since the chemistry of molybdenum-oxygen compounds is very complex, much of it is still subject to some debate and speculation. In the instant catalysts molybdenum probably occurs in the anion as a molybdate, an isopolymolybdate, or a heteropolymolybdate together with some other acidic constituent such as boron, phosphorus, or vanadium. In referring to the present catalysts as comprising molybdenum oxide combined with a basic metal oxide from the group consisting of the oxides of cobalt and nickel, the general formula RO.$n$MoO₃ may be used to illustrate that which is meant by the term "oxide" as used herein in which R represents cobalt or nickel, Depending upon the conditions under which the catalyst is prepared, $n$ may vary from a value greater than 1 to 16 inclusive, it being understood that the atomic ratio of basic metal to molybdenum is to be less than 1:1. Furthermore, it is within the scope of this invention to include catalysts in which the value of $n$ is predominantly 2, 3, or 4 etc., or catalysts which may be composed of a mixture of oxides of the general formula $RO.nMoO_3$ in which the value for $n$ varies for each particular oxide.

Although the foregoing examples illustrate the precipitation of molybdenum in the form of a molybdate with a single basic metal from the group consisting of cobalt and nickel, it is entirely within the scope of this invention to precipitate the molybdenum with a combination of the two basic metals in the form of a mixture of basic metal salts in an aqueous medium or otherwise. Such a modification in the preparation of the subject catalysts can be made so long as the atomic ratio of the basic metal content of the resulting catalyst composition to molybdenum is less than 1:1.

Although satisfactory catalysts can be made from molybdenum oxide plus a basic metal oxide, it is beneficial to incorporate an acidic promoter with these catalyst compositions, the acidic promoter being preferably selected from the group consisting of the oxides of boron, phosphorus and vanadium. Included among other promoters which may be used are silicon, tungsten, titanium, beryllium, zirconium, chromium, and uranium. These promoters are added to the precipitating medium in the form of acids and, subsequent to heating the catalyst at an elevated temperature, the promoters will be present in the catalyst in the form of oxides. From about 0.1% to 15% of the acidic metal, by weight of the total catalysts, should be present in the catalyst. It is to be understood that these promoters act in different ways and, depending upon the particular acidic promoter employed, addition thereof to the catalyst composition may tend to increase the activity of the catalyst, improve the selectivity of the catalyst with respect to the oxidation of particular organic compounds, control the physical structure of the catalyst, or help to control the ratio of basic metal to molybdenum in the process of precipitation of the catalyst.

After precipitation of the catalyst in accordance with the procedure illustrated in the foregoing examples, the catalyst is filtered hot and dried in an oven at about 100° C. Thereafter, the catalyst is maintained at a temperature in the range between about 400° C. to 500° C. in a slow stream of air for at least 3 to 4 hours. Depending upon the type of reactor used, that is, a static bed or a fluid bed of catalyst, the precipitated catalyst is ground to the desired size. The catalyst may be as coarse as 1 to 2 mesh (U. S. Sieve Series) and as fine as 50% through 325 mesh, although the usual range is from 35–325 mesh. Larger particle sizes are used in static bed reactors whereas the fluid bed reactors require smaller particle sizes.

The selection of any specific type of reactor is not a critical factor in this invention but a static or fluidized bed reactor is advantageous as both of these permit the removal of the large amounts of heat generated by the exothermic reaction with reasonably close temperature control. A static bed reactor has been used almost exclusively heretofore in preparing maleic anhydride although recently the fluid bed type of catalytic reactor has become important in cracking petroleum and may be used to advantage in the process of this invention. This type of reactor is thoroughly discussed in Industrial and Engineering Chemistry 35, 768 (1943).

A number of conditions may obviously be varied in carrying out this process but such conditions are not of a critical nature in so far as operativeness of the invention is concerned except that the temperature range of 300° C.–600° C. should be observed. Such conditions include pressure, catalyst bed height, contact time, rate of flow of feed gases, and the content of hydrocarbon in the feed. It has been observed that for optimum production at lowest cost these conditions may vary somewhat from one specific catalyst to the next and, as those skilled in the art will appreciate, a certain amount of adjusting will be required to obtain maximum efficiency. The examples have illustrated to a considerable extent various suitable conditions.

With respect to temperature, it is preferred with all of these catalysts to operate between 350° C. and 550° C. With the precipitated oxide catalyst comprising molybdenum oxide combined with cobalt and, as the promoter, boron oxide, the most favorable temperature is 400° C. to 500° C., specifically 450° C. On the other hand, with the catalyst comprising molybdenum oxide combined with cobalt oxide and, as the promoter, vanadium oxide, a somewhat lower temperature, i. e., 400° C. is the most favorable. Nevertheless, the process can be run anywhere between 300° C. and 600° C. with any of these catalysts although the efficiency of the operation will vary considerably over this broader temperature range.

The hydrocarbon/air ratio or the hydrocarbon/oxygen ratio is not critical. If sufficient oxygen to oxidize the raw material in question is employed, increases over that amount will have no substantial effect upon the yield. Further, oxygen in an amount not sufficient to oxidize all the raw material may be employed and such deficiency does not render the process inoperative but merely means that the yield will not be as high as could be obtained with sufficient oxygen for complete oxidization. The process of this invention is normally carried out at atmospheric pressure but it has been found that substantial change in pressure does not effect the operation of the process, e. g., the yield is substantially unchanged when the oxidization is carried out at 15 p. s. i. absolute and 30 p. s. i. absolute. The choice of a reaction pressure would primarily depend upon the hazards involved in operating at higher pressures, and the economic considerations of investing in high pressure equipment. Where a fluid type catalyst bed is employed, the product yield remains substantially unchanged in variations of the fluid bed height. It is evident, however, that the conversion increases as the fluid bed height increases, thereby increasing the overall production expressed as $$100 \times \frac{\text{moles of maleic anhydride in product gas}}{\text{moles of hydrocarbon in feed gas}}$$

The raw materials for the preparation of maleic anhydride according to the process of this invention are selected from the saturated aliphatic hydrocarbons having from 4 to 10 carbon atoms, inclusive, per molecule. N-butane is preferred and offers advantage over the higher hydrocarbons in that a higher theoretical yield is obtained and the by-products formed by the reaction are of negligible proportions or easily separated. Since no evidence exists that more than one molecule of maleic anhydride can be formed from one molecule of a hydrocarbon having a higher molecular weight than butane, higher hydrocarbons offer the disadvantage of lower theoretical yields. Furthermore, n-butane can be obtained in very good purity at a relatively low price while most other saturated aliphatic hydrocarbons would be of low price only if mixtures were used. Regardless of economic factors, however, it is entirely operative to employ saturated aliphatic hydrocarbons having a greater molecular weight than butane and mixtures thereof. The use of butane offers a high theoretical yield of 1.7 pounds of maleic anhydride per pound of butane oxidized. Owing to the refractory nature of butane, the occurrence of undesirable side reactions is less than with more reactive hydrocarbons and those of higher molecular weight. The formation of colored contaminants is at a minimum in the use of butane as the oxidizable raw material.

Besides maleic anhydride, the only other oxidation products found in the effluent gases when butane is oxidized according to the present invention are carbon dioxide, water vapor, and very minute amounts of formaldehyde. As mentioned heretofore there is no evidence that more than one molecule of maleic anhydride can be formed from one molecule of a hydrocarbon having a higher molecular weight than butane. Consequently, substantially all carbon atoms in the hydrocarbon molecule which are not oxidized to maleic anhydride are oxidized to carbon dioxide, all hydrogen atoms not oxidized to maleic anhydride being oxidized to water. However, the use of hydrocarbons having a higher molecular weight than butane, increases the chances under any given set of conditions of the occurrence of side reactions, especially as the molecular weight of the hydrocarbon oxidized increases.

Upon oxidation of the saturated hydrocarbons to maleic anhydride, the anhydride may conveniently be recovered by one of three methods, namely, water scrubbing, solvent scrubbing and adsorption. The problem of the recovery of the anhydride is complicated by its relatively high volatility with the ready conversion of the anhydride to fumaric acid in the presence of water. If the anhydride is to be recovered as maleic acid, water scrubbing is satisfactory. Solvent scrubbing or adsorption can be used to recover maleic anhydride as such. However, to recover the oxidation product as maleic anhydride it is most desirable to employ adsorption techniques. Activated carbon is considered to be the most satisfactory adsorbent due to its high affinity for organic vapors combined with a very low affinity for water vapor. The preferred procedure for recovering maleic anhydride from the effluent gases is more thoroughly described in applicant's co-pending application Ser. No. 755,014, filed June 16, 1947 now U. S. Patent 2,518,312, An advantage of the present invention is that it provides a new and improved process for the preparation of maleic anhydride from saturated aliphatic hydrocarbons. A particular advantage is that it provides a process for the preparation of maleic anhydride from low cost raw materials such as butane. A still further advantage is that it provides a new and improved type of catalyst for carrying out the vapor phase oxidation of saturated aliphatic hydrocarbons to maleic anhydride.

As many apparently widely different embodiments of this invention may be made without departing from the spirit and scope thereof, it is to be understood that the invention is not limited to the specific embodiments thereof except as defined in the appended claims.

I claim:

1. Process of preparing maleic anhydride which comprises bringing the vapor of a saturated aliphatic hydrocarbon having from 4 to 10 carbon atoms, inclusive, in the presence of oxygen in contact with a precipitated oxide catalyst consisting of molybdenum oxide combined with a basic metal oxide from the group consisting of the oxides of cobalt and nickel, the atomic ratio of the basic metal to molybdenum being from 0.90:1 to 0.62:1, at a temperature between 300° C. and 600° C., and thereafter recovering the maleic anhydride from the effluent gases.

2. Process as set forth in claim 1 wherein the saturated aliphatic hydrocarbon is butane.

3. Process as set forth in claim 1 wherein said temperature is between 350° C. and 550° C.

4. Process of preparing maleic anhydride which comprises bringing the vapor of a saturated aliphatic hydrocarbon having from 4 to 10 carbon atoms, inclusive, in the presence of oxygen in contact with a precipitated oxide catalyst comprising molybdenum oxide combined with a basic metal oxide from the group consisting of the oxides of cobalt and nickel, the atomic ratio of the basic metal to molybdenum being from 0.90:1 to 0.62:1, and combined with an acidic promoter from the group consisting of the oxides of boron, phosphorus, and vanadium, at a temperature between 300° C. and 600° C., and thereafter recovering the maleic anhydride from the effluent gases, the proportion of acidic promoter, calculated as metal, in said precipitated oxide catalyst being 0.1%–15% by weight of said catalyst.

5. Process as set forth in claim 4 wherein the saturated aliphatic hydrocarbon is butane.

6. Process of preparing maleic anhydride which comprises bringing the vapor or a saturated aliphatic hydrocarbon having from 4 to 10 carbon atoms, inclusive, in the presence of oxygen in contact with a precipitated oxide catalyst essentially consisting of molybdenum oxide combined with cobalt oxide, the atomic ratio of cobalt to molybdenum being from 0.90:1 to 0.62:1, and combined with 0.1%–5%, by weight of said catalyst, of boron oxide, calculated as boron, at a temperature between 400° C. and 500° C., and thereafter recovering the maleic anhydride from the effluent gases.

7. Process as set forth in claim 6 wherein the saturated aliphatic hydrocarbon is butane.

References Cited in the file of this patent

UNITED STATES PATENTS

| Number | Name | Date |
|---|---|---|
| 1,675,029 | James | June 26, 1928 |
| 2,020,671 | Dreyfus | Nov. 12, 1935 |
| 2,215,095 | Drossback | Sept. 17, 1940 |
| 2,260,409 | Slotterbeck et al. | Oct. 28, 1941 |
| 2,415,531 | Porter | Feb. 11, 1947 |
| 2,474,334 | Schmidl | June 28, 1949 |
| 2,625,519 | Hartig | Jan. 16, 1953 |

OTHER REFERENCES

Kiprianov et al., Chem. Abstracts, vol. 32, p. 5788 (1938).